Patented Dec. 19, 1939

2,183,736

UNITED STATES PATENT OFFICE 2,183,736

COMPOSITIONS PREPARED FROM AMYLACEOUS SUBSTANCES

Hans F. Bauer, Chicago, Ill., assignor to Stein, Hall Manufacturing Company, Chicago, Ill., a corporation of Delaware No Drawing. Application January 14, 1938, Serial No. 184,929. Renewed July 22, 1939

11 Claims. (Cl. 134—23.4)

This invention relates to new and improved amylaceous compositions and more particularly to new and improved film-forming, coating, impregnating and adhesive compositions and a method for the preparation thereof.

This application is a continuation in part of my copending application, Serial No. 87,015, filed June 24, 1936.

It is an object of this invention to provide new and useful amylaceous compositions capable of forming clear films. Another object is the provision of new and useful coating and impregnating compositions for paper, cloth and similar materials. A further object is the provision of compositions which have unusually powerful adhesive qualities and are especially useful in the more difficult type of adhesive applications, as, for instance, in making envelopes of bond paper. Another object is the provision of amylaceous compositions which will form a film or coating on paper without tending to check or crack, discolor, crystallize or become too hygroscopic. Another object is the preparation of amylaceous film-forming and adhesive compositions which are rendered substantially non-curling by a combination of ingredients therein. Still a further object is the preparation of adhesive compositions which are suitable for making wall papers having a self-contained adhesive. Other objects will appear hereinafter.

In accomplishing these objects in accordance with the present invention, film-forming, adhesive, coating and impregnating compositions are prepared by reacting an amylaceous substance with a substantially water soluble urea and an alkali metal acetate. In carrying out this reaction I have found that starches which are normally insoluble and undispersible in water at ordinary temperatures may be dispersed in water at ordinary temperatures after being reacted with a mixture of a molten alkali metal acetate and molten urea. If water is added, a reaction between the amylaceous substances, urea and acetate may be carried out at ordinary temperatures or at elevated temperatures varying from about 140° F. to about 180° F. When ordinary temperatures are used, the total amount of urea and sodium acetate should preferably be relatively large in order to produce compositions containing starch in a dispersed state. It has been recognized heretofore that starch may readily be dispersed by means of caustic alkali, and urea has been used in small amounts in making plywood adhesives from starches, oxidizing agents and caustic alkalis in order to reduce the water requirements. Prior to my invention it had not been realized, however, that urea alone, if used in sufficiently large amounts, will disperse starches at ordinary temperatures, nor has anyone heretofore suggested the advantage of reacting both an alkali metal acetate such as sodium acetate and a urea with an amylaceous substance to produce film-forming, adhesive, coating and impregnating compositions.

In practicing the invention, I have found that not only will sodium acetate per se disperse starches, but also that the use of sodium acetate in amylaceous compositions, particularly in conjunction with urea, has certain very decided advantages. Thus, sodium acetate tends to produce clear, colorless, transparent film-forming compositions when reacted with starches in conjunction with urea, while without the sodium acetate, such compositions are normally opaque or milky in appearance. The action of sodium acetate is apparently that of a crystallization inhibitor for the urea which otherwise tends to give the compositions a white or milky appearance and tends to produce films having a similar appearance. Sodium acetate at relatively high concentrations also apparently acts as a wetting agent, tending to reduce the surface tension of the resultant compositions and thereby increasing the bond or affinity of such compositions for fibrous materials including paper, cloth, leather and the like. Furthermore, sodium acetate may be used in relatively large amounts without unduly increasing the hygroscopic characteristics of the resultant compositions. Additionally, the combined use of sodium acetate and urea in making amylaceous compositions apparently reduces or entirely prevents curling of such compositions when applied to paper or other flexible sheet materials, which does not seem to be true when either one alone is used.

Compositions prepared in accordance with the invention are preferably substantially neutral, mildly acid or mildly alkaline. No sodium hydroxide or other caustic alkalis are required in their preparation. If desired, they may contain auxiliary gelatinizing agents of the neutral or acid type, bleaching agents, wetting agents, fillers, pigments, dispersing agents, absorbents and urea stabilizing agents.

The invention will be further illustrated, but is not limited, by the following examples in which the quantities are stated in parts by weight unless otherwise indicated:

Example I

A starch composition was prepared by mixing together 55.5 parts of Hercules starch, 22.2 parts of urea, 33.3 parts of sodium acetate and 72 parts of water, until the starch had gelatinized into a paste. The mixing was carried on at a temperature of 180° F. in order to accelerate the gelatinization. The resultant composition was a white paste at ordinary temperatures and gave clear films on glass and paper. The sodium acetate apparently tends to prevent crystallization of any of the components of the mixture and imparts a gloss to the film. Compositions of this type are especially useful as adhesives on the rear flaps of envelopes where it is desirable that the adhesive appear in glossy form. The adhesive composition when applied to bond paper, other types of paper, glass and other materials gave clear, glossy films which did not tend to check or crack. When bond paper containing one of these films which had been previously dried was moistened with water and pressed against another piece of such paper, excellent adhesion of paper to paper was obtained.

Example II

A composition was prepared by mixing together 55.5 parts of Hercules starch, 22.3 parts of urea, 22.2 parts of sodium acetate and 72 parts of water, at a temperature of 165° to 180° F., for about five minutes. The resultant composition was a white fluid substance having properties of gloss and adhesion similar to those described in Example I.

Example III

A composition was prepared by mixing together 20.5 parts of urea, 10.5 parts of sodium acetate, 68 parts of white tapioca dextrin about 40% to 45% water soluble, 1 part of sodium bisulfite, and 41 parts of water, at a temperature of 165° F. A fluid mixture having good adhesive properties was obtained.

Example IV

A composition was prepared by mixing together 18.5 parts of urea, 6 parts of sodium acetate, 15 parts of tapioca dextrin of the type described in Example III, 60 parts of a highly soluble light yellow tapioca dextrin capable of taking up about 0.6 part of water per part of dextrin, 0.5 part of sodium bisulfite and 30 parts of water. This mixture was heated at 165° F. until a gelatinous composition of fluid consistency was obtained. The product possessed good glue and adhesive properties.

Example V

The following compositions were prepared by mixing together the ingredients shown in the various columns listed below:

| | Hercules starch | Dextrin* | Urea | Sodium acetate | Water | Characteristics of product | | |
|---|---|---|---|---|---|---|---|---|
| | | | | | | Gloss | Fluidity | Coating |
| 1 | 50 | 80 | 50 | 20 | 60 | Gloss | Does not flow | Good. |
| 2 | 40 | 80 | 50 | 20 | 60 | Good gloss | do | Do. |
| 3 | 30 | 80 | 50 | 20 | 60 | Gloss | do | Fair. |
| 4 | 20 | 80 | 50 | 20 | 60 | Slight gloss | Flows some | Thin. |
| 5 | 10 | 80 | 50 | 20 | 60 | None | Flows freely | Do. |
| 6 | 15 | 80 | 50 | 20 | 60 | Slight | do | Do. |

* A white corn dextrin product which is about 25% to 30% water soluble.

These compositions were all prepared by mixing the ingredients at room temperature for about ten to fifteen minutes until a homogeneous gelatinous mass was obtained and then allowing them to stand overnight.

The consistency of these compositions was observed at regular intervals for two weeks. Compositions 1, 2 and 3 were too heavy to flow at all times. Composition 4 would barely flow at room temperature of 72° F. for the first six days and after standing for two weeks would not flow. Composition 5 flowed freely, spread very freely and penetrated more than the others of the series. Composition 6 flowed freely and spread easily.

Strips of bond paper (made from 100% rag) were sealed together with each of the six compositions and left in an oven at a temperature of 210° F. for 96 hours. All of the seals were colorless and had firm bonds. Films of the composition were dried at room temperature upon glass. The gloss effect was determined by allowing the compositions to dry on bond paper for 24 hours.

Example VI

The following compositions were prepared by mixing together the ingredients shown in the various columns listed below:

| | Hercules starch | Dextrin* | Urea | Sodium acetate | Water |
|---|---|---|---|---|---|
| 1 | 10 | 80 | 34 | 20 | 60 |
| 2 | 10 | 80 | 34 | 10 | 60 |

*Same as in Example V.

These compositions were prepared in a manner similar to that described in Example V. Composition 1 flowed freely and spread easily. Composition 2 flowed after six days, but did not flow after standing for two weeks. Films of both compositions on glass were tough but not as hard or crystalline as the compositions of Example V. Strips of standard bond paper sealed with these compositions as in Example V had a good bond after being in the oven for 96 hours.

Example VII

The following compositions were prepared by mixing together the ingredients shown in the various columns listed below:

| | Hercules starch | White tapioca dextrin* | Urea | Sodium acetate | Water | Characteristics of product— fluidity |
|---|---|---|---|---|---|---|
| 1 | 50 | 80 | 50 | 20 | 60 | Flows. |
| 2 | 40 | 80 | 50 | 20 | 60 | Flows easily. |
| 3 | 30 | 80 | 50 | 20 | 60 | Flows freely. |
| 4 | 20 | 80 | 50 | 20 | 60 | Flows easily. |

*35.1% soluble in water.

These compositions were prepared by mixing the foregoing ingredients as in Example V. Composition 1 flowed. Composition 2 was easier to spread than composition 1. Composition 3 spread very easily. The entire series produced a good gloss when dried on standard bond paper for 24 hours. Good films were obtained. Strips of bond paper sealed with compositions of this series and dried in a steam-heated oven for 96 hours had a very good bond.

*Example VIII*

The following compositions were prepared by mixing together the ingredients shown in the various columns listed below:

| | Hercules starch | White tapioca dextrin* | Urea | Sodium acetate | Water | Characteristics of product—fluidity |
|---|---|---|---|---|---|---|
| 1 | 50 | 80 | 34 | 20 | 60 | Flows well. |
| 2 | 50 | 80 | 34 | 10 | 60 | Barely flows. |
| 3 | 40 | 80 | 34 | 10 | 60 | Flows. |
| 4 | 40 | 80 | 34 | 5 | 60 | Flows. |
| 5 | 30 | 80 | 34 | 10 | 60 | Flows. |
| 6 | 40 | 80 | 25 | 10 | 60 | Does not flow. |

*35.1% soluble in water.

These compositions, prepared as in Example V, showed the effect of using less urea and sodium acetate. Compositions 1 to 5 flowed. However, composition 2 barely flowed after six days and did not flow after standing 10 days. Composition 6 did not flow at 82° F. All of these compositions made good transparent films on glass with no decided crystallization. Films of the compositions made on standard bond paper and dried for 24 hours all had a good gloss except No. 6 which had only a fair gloss and a tendency to check. Strips of bond paper sealed with compositions of this series and dried in a steam oven for 96 hours had good bonds and showed no discoloration.

*Example IX*

A composition was prepared by mixing together 100 parts of a highly soluble yellow tapioca dextrin capable of taking up about 0.6 part of water per part of dextrin, 25 parts of white tapioca dextrin about 40% to 45% water soluble, 30 parts of urea, 10 parts of sodium acetate, 1 part of sodium perborate and 50 parts of water. The mixture was heated to a temperature of 165° F. in about ten minutes and allowed to cool normally. The resultant product possessed good adhesive and film-forming properties.

*Example X*

A composition was prepared by mixing together 62.5 parts of the white corn dextrin 14% to 15% soluble in water, 25 parts of urea, 12.5 parts of sodium acetate, 0.25 part of citric acid and 32 parts of water. This mixture was heated to a temperature of 175° F. and allowed to cool normally. The resultant product was found to be useful as a seam gum for sealing seams of bond envelopes.

*Example XI*

A composition was prepared in a manner similar to that described in Example X, except that 62.5 parts of a 25% water soluble dextrin were substituted for the 62.5 parts of the white corn dextrin. Good results were obtained with the resultant composition when used as a seam glue.

*Example XII*

The following compositions were prepared by mixing the ingredients together as shown in the various columns listed below:

| | Corn dextrin 25% soluble | Urea | Sodium acetate | Citric acid | Water |
|---|---|---|---|---|---|
| 1 | 71.5 | 28.5 | | | 35.7 |
| 2 | 63 | 32 | 5 | 0.25 | 30 |
| 3 | 70 | 24 | 6 | | 30 |

These compositions were all prepared by mixing the ingredients at room temperature until a homogenous gelatinous mass was obtained and then allowing them to stand overnight. They produced good films on various types of paper including bond paper and were found to be useful as backing or similar gums for bond envelopes.

*Exampe XIII*

A blend was made by mixing together 64% chlorinated corn starch sold under the trade name of "Hercules" starch (fluid at 1 part to 3 parts of water), 25% urea, 5% sodium acetate and 6% Royal tapioca. After these ingredients had been thoroughly blended, an adhesive composition was made by mixing water therewith in proportions corresponding to about 2 parts of water per each part of blend. This mixture was then heated to 175° F. until clear.

It was coated on the back of wall-paper in a thin film which was allowed to dry. Wall-paper thus prepared was non-curling, non-cracking, flexible and the adhesive was non-tacky under ordinary atmospheric conditions. When the adhesive is moistened it will take up relatively large amounts of water, and the paper possesses excellent slip characteristics so that it will slide from one place to another after it has been applied to a wall and before the adhesive is dried. Blisters, wrinkles and the like, which sometimes form in the paper when it is applied, readily shrink out when the paper dries on the wall.

In this example the amount of sodium acetate may be increased from 5% to 15%, the amount of urea being correspondingly decreased.

*Example XIV*

A blend was prepared by mixing together 64% Hercules starch, 25% sodium acetate, 5% urea and 6% Royal tapioca. This blend was then mixed with water in proportions corresponding to 1 part blend to about 2.5 parts of water and was applied to the back of wall-paper with excellent results similar to those described in Example XIII.

In this example the amount of urea may be increased from 5% to 15%, the amount of sodium acetate being correspondingly decreased.

*Example XV*

A blend was prepared by mixing together 15 parts sodium acetate, 45 parts Hercules starch, 35 parts white corn dextrin (75% to 80% soluble) and 5 parts of Royal tapioca. This blend was then mixed with water in proportions of 2 parts water to 1 part of blend and the mixture heated to 180° F. until a homogeneous gelatinous product was obtained.

This product may be employed as a coating for wall-paper. It is non-hygroscopic, has excellent slip characteristics, powerful adhesive qualities and a very hard surface. For some purposes, it is desirable to be able to crack the surface without causing the adhesive to chip off and the above described composition possesses such characteristics. On the other hand, compositions of the character described containing both urea and sodium acetate have a relatively soft surface.

Example XVI

A blend was prepared by mixing together 15 parts of sodium acetate, 35 parts of white corn dextrin (75% to 80% soluble), 5 parts of Royal tapioca and 45 parts of a partially dextrinized wheat starch prepared by dextrinizing wheat in the presence of a gel inhibiting agent such as a bisulfite, as described in my United States Patent 1,969,347. The last mentioned product is known commercially as "Protamyline".

This blend was then heated with 2 parts of water per part of blend to about 180° F. until a uniform gelatinous product was produced. An excellent adhesive coating composition was obtained particularly suitable for making wallpaper having a self-contained adhesive.

Example XVII

A blend was prepared by mixing together 77% partially dextrinized wheat starch (Protamyline), 16% urea, 4% sodium acetate and 3% Royal tapioca. This was cooked to a uniform dispersion with 3 parts of water per part of blend at about 180° F.

The resultant composition is an excellent adhesive coating composition for decalcomania paper. For instance, the decalcomania may be prepared by coating the above composition on a suitable paper, and drying the coating, then applying a coating of a highly soluble composition consisting of one part of water cooked with one part of a blend of 66⅔% Elight dextrin and 33⅓% white tapioca dextrin (40% soluble). Over this coat is then applied a lacquer coating, a print design, and another lacquer coating. If desired, the order of steps may be reversed.

Example XVIII

A blend was prepared by mixing together 15 parts of Royal tapioca starch, 35 parts of corn starch, 15 parts of urea and 35 parts of sodium acetate. This blend was then cooked with 5 parts of water per part of blend at a temperature of about 180° F. to 212° F. for 15 minutes until a uniform dispersion had been obtained. The resultant composition was excellent for use in making wall-paper having a self-contained adhesive.

Example XIX

A blend was prepared by mixing together 10 parts of Royal tapioca starch, 40 parts of corn starch, 30 parts of urea and 20 parts of sodium acetate. This blend was then cooked with 5 parts of water per part of blend at a temperature of about 180° F. to 212° F. for 15 minutes until a uniform dispersion had been obtained. The resultant composition was excellent for use in making wall-paper having a self-contained adhesive.

Example XX

A blend was prepared by mixing together 20 parts of Royal tapioca starch, 30 parts of corn starch, 20 parts of urea and 30 parts of sodium acetate. This blend was then cooked with 5 parts of water per part of blend at a temperature of about 180° F. to 212° F. for 15 minutes until a uniform dispersion had been obtained. The resultant composition was excellent for use in making wall-paper having a self-contained adhesive.

Example XXI

A blend was prepared by mixing together 15 parts of Royal tapioca starch, 35 parts of corn starch, 30 parts of urea and 20 parts of sodium acetate. This blend was then cooked with 5 parts of water per part of blend at a temperature of about 180° F. to 212° F. for 15 minutes until a uniform dispersion had been obtained. The resultant composition was excellent for use in making wall-paper having a self-contained adhesive.

Example XXII

A blend was prepared by mixing together 20 parts of Royal tapioca starch, 30 parts of corn starch and 50 parts of sodium acetate. This blend was then heated with about 5 parts of water per part of blend to a temperature of 180° F. for 15 minutes. An excellent adhesive for use in making wall-paper having a self-contained adhesive was thus obtained.

Example XXIII

A blend was prepared by mixing together 25 parts of Royal tapioca starch, 25 parts of corn starch and 50 parts of urea. This blend was then heated with 5 parts of water per part of blend for about 15 minutes at about 180° F. to 200° F. until a uniform dispersion had been obtained. The resultant composition is an excellent film-forming composition and when applied to wall-paper and dried in any suitable manner in order to form a wall-paper having a self-contained adhesive, this composition has excellent slip characteristics and adhesive qualities on remoistening.

In the last three examples it will be noted that both of the starch components of the compositions described have relatively high water absorptive capacities although the water absorptive capacity of each component is different. In these adhesives the stringiness characteristic of tapioca is compensated for by the shortness of the corn starch and the combination of the two produces excellent results.

It will be apparent that modifications may be made in the proportions of the various compositions and in the use of auxiliary agents in preparing them. The dextrins may be such as are derived from starches by the usual methods of conversion, for example, hydrolysis, oxidation, heating or enzymatic action. Starches and dextrins derived from wheat, rice, barley, corn, oats, rye, potato, cassava and sago may be used. In some instances, it is preferable to use mixtures of starches and dextrins in preparing the compositions herein described. In other instances, as illustrated in the examples, it is preferable to use mixtures of different types of starches of varying water absorptive capacities.

While the best results have been obtained in the use of urea per se, it will be understood that other ureas and particularly water soluble ureas having a similar action, may be employed to replace urea wholly or in part. Hence, the expression "a urea" is herein employed to cover substituted urea, e. g., monomethyl urea, monoethyl urea, symmetrical dimethyl urea and higher homologues as well as analogues, e. g., thiourea.

The proportions of urea and alkali metal acetate are subject to variation depending upon such factors as the type of amylaceous substance and the quantity of water. If the composition contains a starch in substantial amounts, say 10% or more based upon the total weight of the amylaceous material, it is preferable to use a relatively large amount of urea and alkali metal acetate, for instance, a total urea and sodium acetate content in excess of about 25% of the total solids content of the composition. The lower limits of the amounts of urea and alkali metal acetate employed in treating amylaceous substances containing starch are those amounts which will produce a product which is gelatinous at ordinary temperatures as distinguished from a hard solid which cannot be readily applied and cannot be readily flowed into films. If the amylaceous material is of a highly soluble dextrin nature and readily forms a homogeneous suspension in water at ordinary temperatures and pressures, the amounts of urea and alkali metal acetate may be relatively small. The amounts of urea and alkali metal acetate are preferably such that the urea and alkali metal acetate will dissolve in the water present when the ingredients are reacted with an amylaceous substance in the presence of water. Generally speaking, the minimum amount of urea is about 5%, the minimum amount of alkali metal acetate is about 5%, the maximum amount of alkali metal acetate about 30% and the maximum amount of urea about 40%, all of said percentages being based upon total solids in the composition.

In making adhesives for wall-paper having a self-contained adhesive, it is preferable to employ a mixture of amylaceous substances some of which have low water absorptive capacities and others of which have high water absorptive capacities. As examples of substances which have low water absorptive capacities may be mentioned Hercules starch, thin boiling starches as, for instance, a starch known in the trade as "thin boiling 90", white tapioca dextrin, about 8% to about 10% soluble, and low soluble corn dextrins (about 8% to about 15% soluble). As examples of amylaceous substances which have high water absorptive capacities may be mentioned Royal tapioca, which is high grade cassava starch, and potato starch, both of which have a water absorptive capacity of about 16 to about 18 parts of water per part of starch. Corn starch which has an absorptive capacity from about 12 to about 15 parts of water per part of starch may be employed, although it tends to give a rather short body in the adhesives. Thin boiling corn starch having an absorptive capacity of about 8 to about 10 parts water per part of starch may also be used.

The term "low water absorptive capacity" is employed herein, as applied to amylaceous materials, to define amylaceous materials which will become fluid upon the addition of about 4 parts of water or less. The expression "high water absorptive capacity" is used to describe materials which will take up and become fluid when heated with about 8 parts of water or more.

It is usually preferable that a starch of low water absorptive capacity, say within the range of 1 part of starch to 2 to 3 parts of water, form the major portion of the solids present in the adhesive composition and also represent a major portion of the amylaceous materials present. If starches of high water absorptive capacity are employed, they preferably form a minor portion of the adhesive composition and usually less than the combined amount of urea and alkali metal acetate. Generally speaking, in making wall-paper adhesives the amount of starch having high water absorptive capacity is preferably in the range of about 5% to about 12% of the total solids and about 8% to about 15% of the amount of starch having a low water absorptive capacity. The total amount of urea and sodium acetate is preferably not greater than about 45% of the total solids and preferably within a range of about 25% to about 45% of the total solids.

In some instances it may be desirable to add an acid as a urea stabilizing agent. For this purpose very small amounts of acid are required, being in the neighborhood of about 2% or less. Acids which are normally solid at ordinary temperatures are preferred, for example, citric acid, tartaric acid, malic acid, boric acid and the like.

The sodium acetate employed may be granulated or powdered sodium acetate, either 60%, 90% or anhydrous, the first mentioned being preferred. Sodium diacetate having available acetic acid of from 33% to 35% may also be used.

Urea is practically neutral, and sodium acetate in water ordinarily has a pH of from 7 to 8. Generally speaking, it is preferable to carry out the treatment of the amylaceous substance as previously described at a pH less than about 8.

Urea may be used without sodium acetate or sodium acetate without urea, but the combination of both appears to give results which are more than merely additive. The urea and sodium acetate may be replaced in part by other starch gelatinizing agents, as, for example, resorcinol, chloral hydrate, sodium salicylate, calcium chloride, zinc chloride, magnesium chloride and potassium acetate. Compounds of phenolic nature, however, sometimes suffer from the disadvantage that the compositions tend to turn dark. The compound chosen, furthermore, should preferably be one which is normally solid at ordinary temperatures and one which is not too hygroscopic. Bleaching agents may be used, for example, sodium bisulfite or sodium hydrosulfite. Fillers may be used to give body to the product, as for example, clay, kaolin, zinc oxide and the like.

In preparing the compositions, the amount of water may vary depending upon the nature and proportions of the ingredients. Less water is usually required with dextrins than with starches. For instance, a dextrin may take up from about 0.5 part to 2.0 parts of water per part of dextrin; a so-called modified starch may be capable of taking up from 2 to 15 parts of water per part of starch, and an undegenerated starch may take up about 15 to 30 parts of water to each part of starch. In general, it is preferable to use as little water as possible to obtain the desired fluid and film-forming characteristics and to produce a colloidal dispersion or solution. In making envelope adhesives it is generally preferable that the ratio of water to total solids be within the range of about 1 to 4 to 1 to 1. In making adhesives for the seams of paper bags it is preferable to use from 1 to 3.5 parts of water per part of solids. In making wall-paper adhesives it is preferable to regulate the proportions of ingredients in such a way that the water requirements in preparing the composition are about 1 to about 4 parts of water per part of blended solid ingredients.

If desired, a base material may be prepared by merely mixing together the solid ingredients in the dry state. This mixture may then be treated with water to form an adhesive composition. Compositions prepared by merely mixing together the urea, alkali metal acetate and amylaceous materials are especially suitable for shipment as such. Instead of merely mixing the ingredients at ordinary temperatures and pressures, the urea, alkali metal acetate and amylaceous substance may be heated together without the addition of water at a temperature above the melting point of the urea and alkali metal acetate and the resultant composition allowed to cool and then ground.

It will be recognized that the time of mixing will vary depending upon the size of the batch and the efficiency of the apparatus. Usually the mixing is effected until a homogeneous gelatinous product is obtained. The temperatures employed should be below temperatures at which substantial decomposition of the urea and alkali metal acetate occur. Atmospheric, subatmospheric or superatmospheric pressures may be employed.

The method of applying the compositions to paper or other material to be coated or impregnated may vary widely depending upon the particular composition and the particular type of material to which it is applied. Any of the well known methods of coating may be used, including well known methods of utilizing doctor blades and well known expedients such as reverse curling of the paper or other material to be coated. Good results have been obtained in utilizing certain of the compositions herein described for backing seams and as seal gums in making envelopes, particularly in making envelopes from bond paper, since these compositions appear to possess much more powerful adhesive qualities than the ordinary type of starch adhesive. As illustrated in some of the examples, certain of the compositions are excellent for making wallpaper having a self-contained adhesive. The compositions are especially useful for coating flexible sheet materials since the presence of the alkali metal acetate with the other ingredients of the composition apparently tends to inhibit or prevent curling, and the results obtained in this respect with the combined use of urea and sodium acetate are much better than with either of these materials alone. The compositions are not limited to use in coating or impregnating flexible sheet materials but may be used in coating, impregnating and sizing all types of fibrous materials including paper, cloth and similar materials. Likewise they may be used in coating wood, glass and metal, for example, metal cans. Good results are obtained in gluing varnished labels on cans. The compositions described may also be used in making tight wrapped boxes without warping. Since my compositions are substantially free from oxidizing agents and other substances which might prove harmful to dyes, they can readily be used in coating and impregnating dyed paper and fabrics.

Having thus described the invention, what I claim as new and desire to secure by Letters Patent of the United States is:

1. An adhesive composition comprising a reaction product of an amylaceous substance, a substantially water soluble urea and an alkali metal acetate in water, said urea and alkali metal acetate being substantially the sole solubilizing agents for the amylaceous substance present in said composition, the urea being present in a minimum amount of about 5% and the alkali metal acetate being present in sufficient amount to produce a composition, the dried films of which are clear, flexible, and have strong re-tacking properties when moistened.

2. An adhesive composition comprising a water-dispersed reaction product of a substantially water soluble urea, an alkali metal acetate and a mixture of amylaceous substances of differing water absorptive capacities, said urea and alkali metal acetate being substantially the sole solubilizing agents for the amylaceous substances present in said composition, the urea being present in a minimum amount of about 5% and the alkali metal acetate being present in sufficient amount to produce a composition capable of forming films which when dried are clear and flexible and have strong re-tacking properties when moistened.

3. An adhesive composition comprising a water-dispersed reaction product of a substantially water soluble urea, an alkali metal acetate and a plurality of amylaceous substances including an amylaceous substance having low water absorptive capacity and an amylaceous substance having a high water absorptive capacity, said urea and alkali metal acetate being substantially the sole solubilizing agents for the amylaceous substances present in said composition, the urea being present in a minimum amount of about 5% and the alkali metal acetate being present in sufficient amount to produce a composition capable of forming films which when dried are clear and flexible and have strong re-tacking properties when moistened.

4. An adhesive composition comprising a reaction product of an amylaceous substance, a substantially water-soluble urea and an alkali metal acetate in water, said urea and alkali metal acetate being substantially the sole solubilizing agents for the amylaceous substance present in said composition, the minimum and maximum amounts of urea being about 5% and about 40% respectively, based upon total solids, and the minimum and maximum amounts of alkali metal acetate being about 5% and about 30% respectively, based upon total solids, the relative proportions of said urea and alkali metal acetate being sufficient to produce a composition forming films which when dried are clear and flexible, and have strong re-tacking properties when moistened.

5. An adhesive composition the dried films of which are clear, flexible and have strong re-tacking properties when moistened, said composition comprising a reaction product of a starch, a substantially water soluble urea and alkali metal acetate in water, said urea and alkali metal acetate being substantially the sole solubilizing agents for the amylaceous substance present in said composition, the minimum and maximum amounts of urea being about 5% and about 40%, respectively, based upon the total solids, and the minimum and maximum amounts of alkali metal acetate being about 5% and about 30% respectively based upon the total solids.

6. An adhesive composition comprising a reaction product of a substantially water soluble urea, an alkali metal acetate and a mixture of amylaceous substances of differing water absorptive capacities, said urea and alkali metal acetate being substantially the sole solubilizing agents for the amylaceous substances present in said composition, the minimum and maximum amounts of urea being about 5% and about 40%, respectively based upon the total solids and the minimum and maximum amounts of alkali metal acetate being about 5% and about 30%, respectively, based upon total solids, the relative portions of said urea and alkali metal acetate being sufficient to produce a composition capable of forming clear flexible dried films having strong re-tacking properties when re-moistened.

7. An adhesive composition comprising a reaction product of a substantially water soluble urea, an alkali metal acetate, a starch and a dextrin, said urea and alkali metal acetate being substantially the sole solubilizing agents for the amylaceous substances present in said composition, the minimum and maximum amounts of urea being about 5% and about 40%, respectively, based upon total solids and the minimum and maximum of alkali metal acetate being about 5% and about 30%, respectively, based upon total solids, the relative proportions of said urea and alkali metal acetate being sufficient to produce a composition forming clear films when dried having strong re-tacking properties when re-moistened.

8. An adhesive composition yielding dried films which are clear and have strong re-tacking properties when moistened, said composition comprising a gelatinized reaction product of a substantially water soluble urea, an alkali metal acetate and a plurality of starchy substances including a starch having a low water absorptive capacity and a starch having a high water absorptive capacity, the amount of starch having high water absorptive capacity being within the range of about 5% to about 12% of the total solids and being about 8% to about 15% of the amount of starch having a low water absorptive capacity, the minimum and maximum amounts of urea being about 5% and about 40%, respectively, based upon total solids, and the minimum and maximum amounts of alkali metal acetate being about 5% and about 30%, respectively, based upon total solids, the relative proportions of said urea and alkali metal acetate being sufficient to produce a composition forming clear films when dried and having strong re-tacking properties when re-moistened.

9. An adhesive composition consisting essentially of a reaction product of an amylaceous substance, urea and sodium acetate in water, the minimum and maximum amounts of urea being about 5% and about 40%, respectively, based upon total solids and the minimum and maximum amounts of sodium acetate being about 5% and about 30%, respectively, based upon total solids, the relative proportions of urea and sodium acetate being sufficient to produce a composition forming clear, flexible, dried films.

10. A re-moistening adhesive composition consisting essentially of a water-dispersed reaction product of starch, urea and sodium acetate, the total amounts of urea and sodium acetate corresponding to about 25% to about 50% of the total solids, the minimum and maximum amounts of urea being about 5% and about 40%, respectively, based upon total solids, and the minimum and maximum amounts of alkali metal acetate being about 5% and about 30%, respectively, based upon total solids, the relative proportions of urea and sodium acetate being sufficient to produce a composition capable of being dried to form clear, flexible films having strong re-tacking properties when re-moistened.

11. A re-moistening adhesive composition formed from a dispersed amylaceous substance, urea and an alkali metal acetate, the urea and alkali metal acetate each being present in amounts in excess of about 5% by weight of the total solids, the proportions of the ingredients in said composition being such as to produce flexible, clear, dried films thereof having re-tack properties when moistened.

HANS F. BAUER.